Oct. 4, 1927.
L. LANQUETIN
1,644,065
ELECTRIC APPARATUS SERVING AS A DYNAMO
OR MOTOR AND AS AN ENGINE STARTER
Filed July 16, 1925
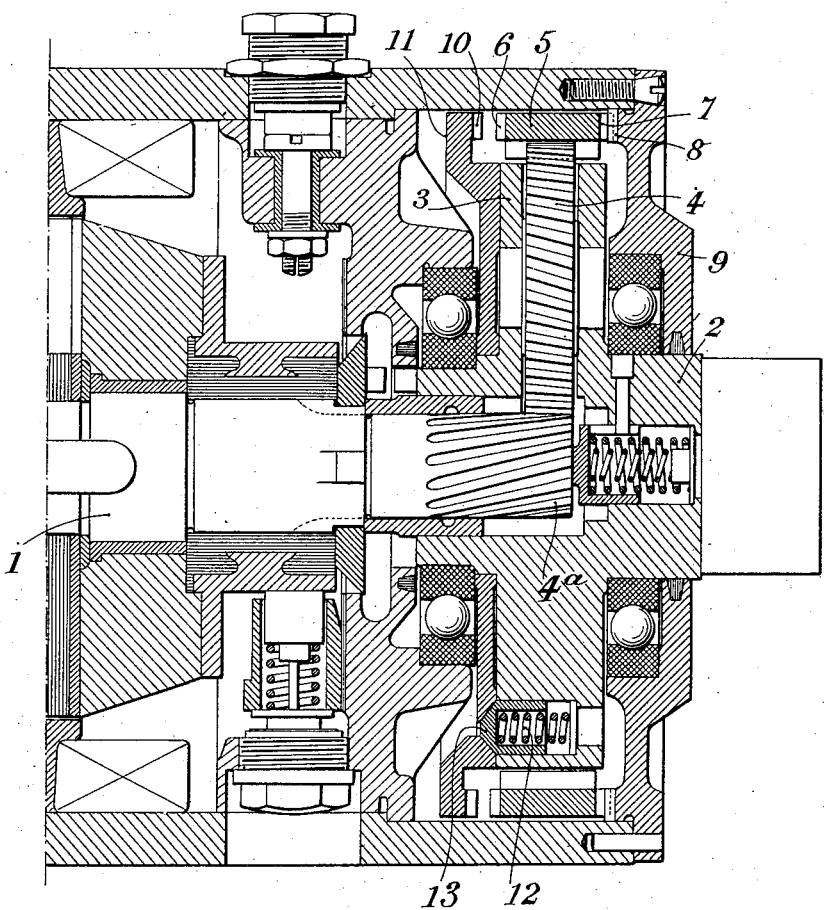
Inventor
L. Lanquetin
by Langner, Parry, Card & Langner
Attys Patented Oct. 4, 1927.

1,644,065

UNITED STATES PATENT OFFICE.

LÉON LANQUETIN, OF PARIS, FRANCE, ASSIGNOR TO SOCIÉTÉ ETABLISSEMENTS DUCELLIER, OF PARIS, FRANCE.

ELECTRIC APPARATUS SERVING AS A DYNAMO OR MOTOR AND AS AN ENGINE STARTER.

Application filed July 16, 1925, Serial No. 44,116, and in France November 5, 1924.

The present invention relates to an electric apparatus serving as a starter for internal combustion engines and also as a dynamo for producing current during the normal operation, in which the armature shaft is connected with the engine shaft by means of a planetary gear set whereof the gear carrier is coupled to one of the shafts and the toothed ring may be axially displaced, for coupling it either with the said gear holder or with the stationary casing of the apparatus.

Known apparatus of this class is in use in which the toothed ring is provided on its lateral faces with ratchet teeth engaging either with corresponding teeth on one side of the planetary gear carrier or with teeth upon one side of the casing.

In an apparatus of this kind, should a back-fire of the engine take place during the starting period, the toothed ring will be held upon the said casing and the armature will be driven at an increased speed. At this time, should the motor suddenly stop, the reactions on the said ring will be changed in direction so that the ring will be connected with the planetary gear holder and the armature will suddenly stop, thus producing shocks which might damage the teeth.

To obviate this drawback, I employ according to my invention suitable devices which permit the increase in the speed of the armature, but prevent all shocks when the engine suddenly stops after the back-fire.

Such devices, which I will hereinafter designate as "effort-limiting devices", may be placed at any desired point in the apparatus. They are inoperative when the starter is functioning, and may slip when the engine drives the apparatus in the direction corresponding to the functioning as a dynamo and when the load couple exceeds the couple required to drive the dynamo, which will take place in the event of back fire of the engine.

The appended drawing shows by way of example one embodiment of the invention.

The figure is a longitudinal section of the change-speed box of the apparatus, which is provided with an effort limiting device.

1 is the shaft of the starter, 2 a shaft adapted to be coupled to the shaft of the engine, 3 the planetary gear holder which is mounted on the shaft 2, 4 the planetary pinions engaging a worm wheel $4^a$ which is formed on the shaft 1, and with the axially movable toothed ring 5.

As is well known in such devices, the ring 5 (carrying the clutch teeth 6 and 7 on its respective faces) when subjected to the reactions due to the teeth of the spiral gear, will come to a stop during the starting of the engine, due to the engagement of its teeth 7 with the like teeth 8 mounted on the stationary bearing 9 which is secured to the end of the casing of the apparatus.

When the apparatus ceases to act as a starter and now acts as a generator, the reactions whose direction is reversed will have the effect of displacing the said toothed ring in the contrary direction to the preceding, and its teeth 6 will engage the like teeth 10.

In the known apparatus, these teeth 10 form part of the planetary gear holder 3 and are hence secured to the engine shaft; but in the device herein represented they are mounted on a disk 11 which is rotatable relatively to the planetary gear carrier; said disk is centered on the shaft 2 and is coupled to the planetary gear carrier by the friction studs 13, urged by the springs 12; the pressure of said springs is so calculated that the friction will insure the functioning of the apparatus as a generator, but will allow the disk 11 to rotate on the shaft 2 should a back-fire occur in the engine, thus producing a shock.

Obviously, the invention is not limited to the forms of construction hereinbefore set forth by way of example, and I may employ all desired forms of effort-limiting devices other than what are herein represented.

In like manner, the effort-limiting device may be disposed at other points on the apparatus, and for instance I may place it upon the shaft of the armature between the latter and the pinion $4^a$ which forms part of said shaft in the embodiment shown.

I may further, without departing from the spirit of the invention, dispose any suitable effort-limiting device upon an apparatus serving as a starter and as a generator which may be of a different type than the one to which the said device is applied by way of example.

Having thus described my process and apparatus, what I claim as new therein, and own invention, is—

In an electric apparatus serving as a starter for an internal combustion engine as well as a dynamo driven by the said engine during the normal operation of the latter, the combination of the armature shaft of the electric apparatus with a main shaft adapted to be coupled to the said engine, the said shafts being disposed on a common axis, a spiral gear on the said armature shaft, a planetary pinion carrier on the said main shaft, planetary pinions with helicoidal teeth mounted on the planetary pinion carrier and adapted to engage the said spiral gear, an axially movable ring provided with an internal helicoidal toothing and adapted to continually engage the said planetary pinions, a plate adapted to freely rotate on the said main shaft, stopping means provided for on the said plate and on the said toothed ring in order to make these two parts integral when the said ring is displaced according to a given direction, stopping means on a stationary part of the said electric apparatus and on the said ring in order to stop the latter when displaced in the contrary direction, and slip coupling means for connecting together the said plate and the said planetary pinion carrier, the said means comprising spring studs upon one of the said plate and planetary pinion carrier, adapted to engage and eventually to slip upon the other of these two parts.

In testimony whereof I have hereunto affixed my signature.

LÉON LANQUETIN.